(12) United States Patent
Aihara et al.

(10) Patent No.: US 8,261,775 B2
(45) Date of Patent: Sep. 11, 2012

(54) LAYERED SCAVENGING CARBURETOR

(75) Inventors: Tamio Aihara, Miyagi-Pref. (JP);
Yoshiaki Douyama, Shiroishi (JP);
Shinichi Ohgane, Miyagi-Pref. (JP)

(73) Assignee: Walbro Engine Management, L.L.C., Tucson, AZ (US)

( * ) Notice: Subject to any disclaimer, the term of this patent is extended or adjusted under 35 U.S.C. 154(b) by 772 days.

(21) Appl. No.: 12/367,264

(22) Filed: Feb. 6, 2009

(65) Prior Publication Data
US 2009/0194726 A1   Aug. 6, 2009

(30) Foreign Application Priority Data
Feb. 6, 2008   (JP) .................. 2008-026567

(51) Int. Cl.
*F16K 31/06* (2006.01)
*F16K 5/10* (2006.01)
*F02M 11/02* (2006.01)

(52) U.S. Cl. ............ 137/595; 251/209; 261/23.2

(58) Field of Classification Search .......... 251/208–209, 251/310; 137/595; 261/23.2, DIG. 52, DIG. 1
See application file for complete search history.

(56) References Cited

U.S. PATENT DOCUMENTS

| | | | |
|---|---|---|---|
| 4,075,985 A | 2/1978 | Iwai | |
| 4,881,718 A * | 11/1989 | Champagne | 251/209 |
| 5,749,335 A * | 5/1998 | Flanery et al. | 123/337 |
| 6,112,708 A | 9/2000 | Sawada et al. | |
| 6,216,650 B1 | 4/2001 | Noguchi | |
| 6,298,811 B1 | 10/2001 | Sawada et al. | |
| 6,334,606 B1 | 1/2002 | Tobinai et al. | |
| 7,429,033 B2 | 9/2008 | Seki et al. | |
| 2003/0205685 A1* | 11/2003 | Whang | 251/209 |
| 2004/0251564 A1* | 12/2004 | Mavinahally | 261/23.3 |
| 2005/0139179 A1 | 6/2005 | Mavinahally et al. | |
| 2006/0125125 A1 | 6/2006 | Seki et al. | |
| 2008/0041466 A1 | 2/2008 | Aihara et al. | |
| 2009/0007894 A1* | 1/2009 | Wada et al. | 123/73 V |

FOREIGN PATENT DOCUMENTS
WO   2007102428 A1   9/2007
* cited by examiner

*Primary Examiner* — John Rivell
*Assistant Examiner* — David Colon Morales
(74) *Attorney, Agent, or Firm* — Reising Ethington P.C.

(57) ABSTRACT

A scavenging valve assembly is used in a carburetor. The valve assembly includes a throttle valve and a rotary air valve. The throttle valve opens and closes an air-fuel passage. The rotary air valve opens and closes an air passage and has one or more air bore(s). When the rotary air valve begins to rotate, airflow travels through the bore(s) and the size of an opening area that airflow travels through continuously increases in size.

19 Claims, 7 Drawing Sheets

US 8,261,775 B2

LAYERED SCAVENGING CARBURETOR

REFERENCE TO RELATED APPLICATION

Applicants claim priority of Japanese Patent Application, Ser. No. 2008-026567, filed Feb. 6, 2008.

FIELD OF THE INVENTION

The present invention relates generally to carburetors, and more particularly to valves and valve assemblies used in carburetors.

BACKGROUND OF THE INVENTION

Two-stroke internal combustion engines such as those used in chainsaws, brushcutters, and the like, are often equipped with carburetors for mixing and supplying air and fuel to the engine. Some scavenging carburetor arrangements may have separate air-fuel passages and air passages that may help reduce, and often prevent, undesirable flow-through and fuel-loss through its exhaust. Some of these arrangements may not generate air and fuel mixtures that are lean for an idle operating condition, for startup, or for other low speed and low load operating conditions. And some of these arrangements may generate air and fuel mixtures that are too lean upon a rapid acceleration of the internal combustion engine.

SUMMARY OF THE INVENTION

One embodiment of a scavenging valve assembly for use in a carburetor may include a throttle valve and a rotary air valve. The throttle valve opens and closes an air-fuel passage. The rotary air valve may have one or more air bore(s) extending therethrough. When the rotary air valve begins to rotate, airflow may travel through the air bore(s) and the size of an opening area that airflow travels through in the air bore may continuously increase.

One embodiment of a valve assembly for use in a carburetor may include a throttle valve and an air valve. The air valve has an air bore that may extend from a first open end to a second open end. The air valve may have a first cutout located at the first open end, and may have a second cutout located at the second open end. When the air valve is in a fully closed position, airflow may travel through the air bore. And when the air valve moves from the fully closed position to a fully open position, the amount of airflow traveling through the air bore continuously increases in value.

One embodiment of a valve assembly for use in a carburetor may include a throttle valve, a rotary air valve, and a synchronizing mechanism. The rotary air valve may have a body with one or more air bore(s) extending through the body. The synchronizing mechanism may connect the throttle valve to the rotary air valve in a way so that movements of the throttle and air valve are concurrent from a closed position to an open position. When the rotary air valve rotates from the closed position to the open position, the rate of change of airflow traveling through the air bore may increase as a rotational opening angle of the air valve increases.

BRIEF DESCRIPTION OF THE DRAWINGS

The following detailed description of preferred embodiments and best mode will be set forth with reference to the accompanying drawings, in which.

DETAILED DESCRIPTION OF THE PREFERRED EMBODIMENTS

Referring in more detail to the drawings, FIGS. 1-5 show an exemplary embodiment of a valve assembly 10 that may be used in a carburetor (not fully shown) for a small two-stroke internal combustion engine such as those found in chainsaws, brushcutters, and the like. The valve assembly 10 may include a throttle valve 12 to regulate air and fuel mixture flow, and may include an air valve 14 to regulate scavenging airflow. The air valve 14 may be designed and constructed to continuously increase the amount of airflow that travels through the air valve from a fully closed position to a fully open position without a period of no increase of airflow and without decreasing the amount of airflow.

Figure 2:
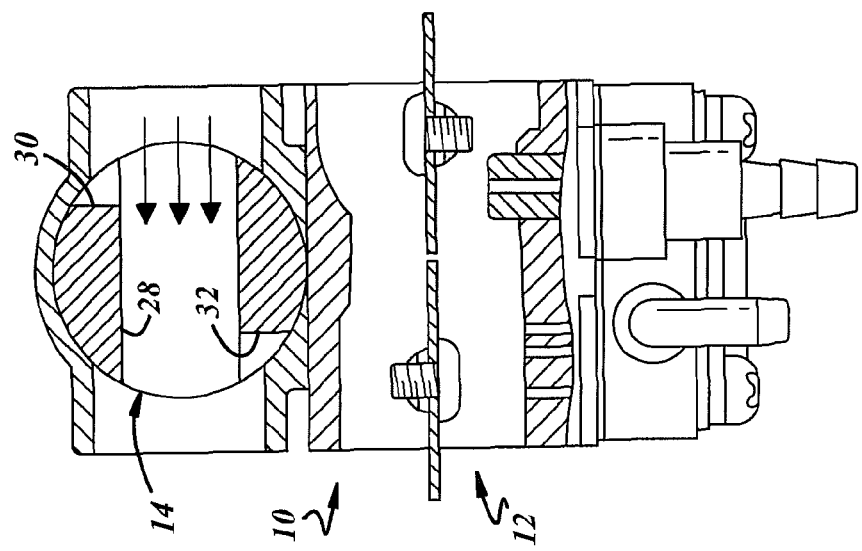
FIG. 2 is a sectional view of an exemplary embodiment of a valve assembly shown in a fully closed position.

The carburetor mixes and supplies air and fuel to the internal combustion engine. The carburetor may be of the float (a.k.a., bowl) chamber type, diaphragm chamber type, or other type. The valve assembly 10 may regulate fluid-flow in the carburetor by permitting flow when the valve assembly is open, preventing or substantially restricting flow when it is closed, and permitting some flow therebetween. Referring to FIG. 2, the throttle valve 12 may include a choke valve 16 and a butterfly valve 18 that are disposed in an air-fuel passage 20 and that open and close the air-fuel passage. The throttle valve 12 may be separate from the air valve 14 as shown, where the valves may be connected through a mechanical linkage or some other means, or may be one-piece where the throttle valve would be a rotary type valve. In the case of a mechanical linkage, a lost motion may exist between the throttle valve 12 and the air valve 14 whereby the throttle valve may move open before the air valve begins to move open; or the throttle valve and the air valve may be linked in a synchronizing manner whereby the throttle valve and the air valve move simultaneously. The valve assembly 10 may also include an air passage 22 which may define an airflow axis A about which airflow may generally be directed.

Figure 1:
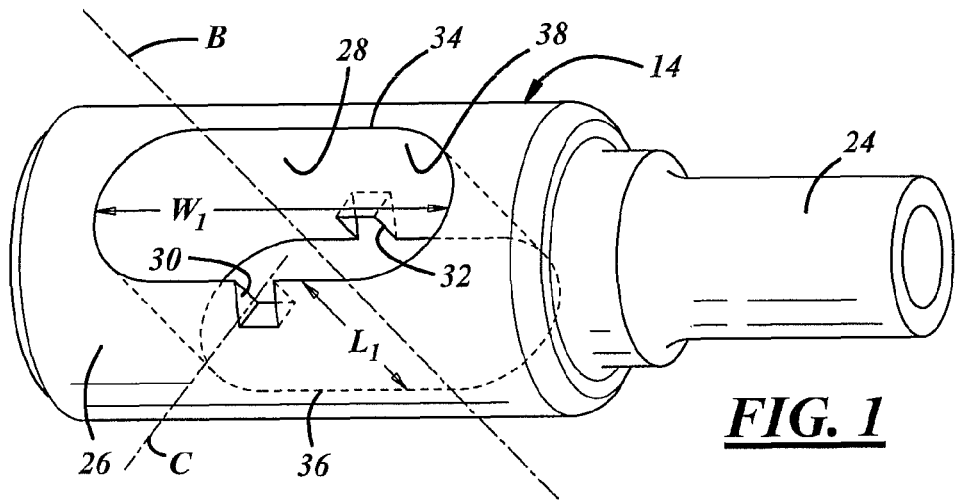
FIG. 1 is a perspective view of an exemplary embodiment of an air valve.
Figure 5:
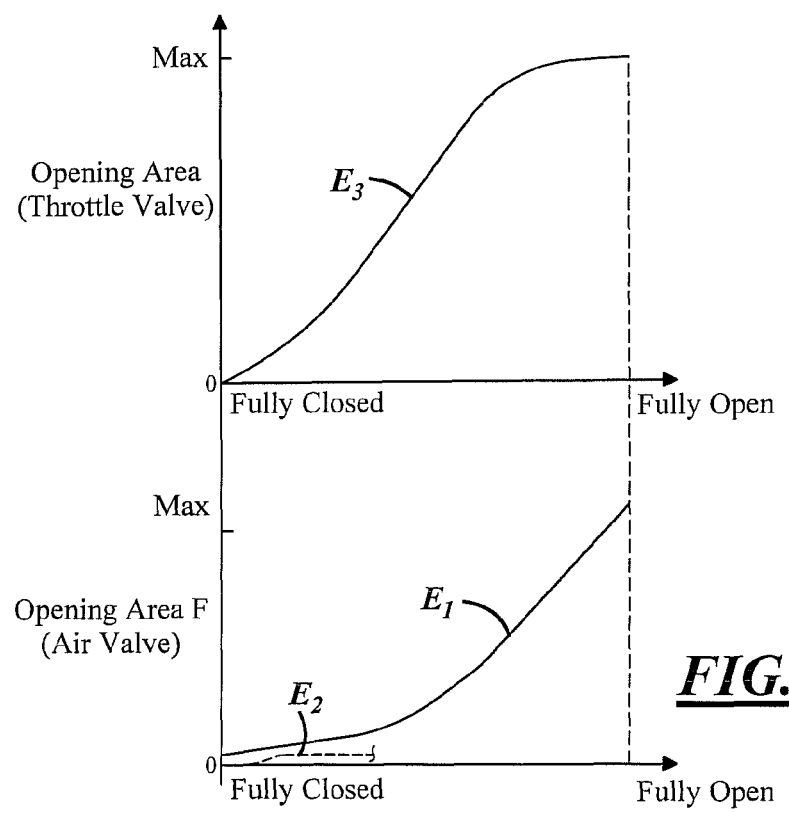
FIG. 5 is a graph showing the opening areas of the valve assembly of FIG. 2 from a fully closed position to a fully open position.

The air valve 14 may regulate airflow through the air passage 22 by permitting flow when the valve is open, permitting some flow when the valve is closed, and permitting flow therebetween. Referring to FIG. 1, the air valve 14 may be of the rotary type and thus may be rotated during operation. The air valve 14 may be constructed as one-piece, or may be constructed out of multiple pieces. A stem portion 24 may be cylindrically shaped and may be used to rotate the air valve 14. A body portion 26 may be cylindrically shaped, may extend from the stem portion 24, and may define an air bore 28, a first cutout 30, and a second cutout 32.

The air bore 28 communicates airflow from one side of the air passage 22 and to the other side of the air passage. Referring to FIGS. 1 and 2, the air bore 28 may have a generally cylindrical or oval shape and may define a center axis B. The air bore 28 may have a smaller diameter than the air passage 22, though need not. The air bore 28 may be formed completely through the body portion 26 and may extend from a first open end 34 and to a second open end 36. An inner surface 38 may bound the air bore 28. In cross-section as shown in FIG. 2, the air bore 28 may form a first portion 40 and an opposite second portion 42 in the body portion 26.

The first cutout 30 communicates airflow to the air bore 28 when the air valve 14 is in the fully closed position, and when the air valve is initially opening. The first cutout 30 may be formed at the first open end 34 such that it intersects the first open end and leads to the air bore 28. In one sense, the first cutout 30 may be considered an integral part of the air bore 28 or an integral part of the first open end 34. The first cutout 30 may be a three-dimensional notch or slit formed in an edge of the first open end 34, and may have a number of shapes including a rectangular shape as shown, a semi-cylindrical shape, a V-shape, or the like. The first cutout 30 may define a first center axis C. The first center axis C may run along an imaginary radius of the air bore 28, may be transverse to the center axis B, and may intersect the center axis B at a perpendicular angle. The first cutout 30 may have a lateral width which is substantially smaller than a lateral width $W_1$ of the air bore 28, and may have a longitudinal length which is substantially smaller than a longitudinal length $L_1$ of the air bore 28.

The second cutout 32 communicates airflow out of the air bore 28 when the air valve 14 is in the fully closed position, and when the air valve is initially opening. The second cutout 32 is located at a position that is diametrically and axially opposite the location of the first cutout 30 with respect to the air bore 28. The second cutout 32 may be formed at the second open end 36 such that it intersects the second open end and leads to the air bore 28. In one sense, the second cutout 32 may be considered an integral part of the air bore 28 or an integral part of the second open end 36. The second cutout 32 may be a three-dimensional notch or slit formed in an edge of the second open end 36, and may have a number of shapes including a rectangular shape as shown, a semi-cylindrical shape, a V-shape, or the like. The second cutout 32 may define a second center axis D. The second center axis D may run along an imaginary radius of the air bore 28, may be transverse to the center axis B, and may intersect the center axis B at a perpendicular angle. The second cutout 32 may have a lateral width which is substantially smaller than the lateral width $W_1$, and may have a longitudinal length which is substantially smaller than the longitudinal length $L_1$.

In use, the air valve 14 instantaneously and continuously increases the amount of airflow through the air bore 28 and thus to the associated internal combustion engine when the air valve is initially moved from the fully closed position and is further moved to the fully open position. That is, in at least one implementation the amount of airflow does not remain the same during any period of continuous movement from the fully closed position and to the fully open position, and does not decrease during any period of continuous movement. This may keep the air and fuel mixture progressively leaner during start-up and beyond, to thus help decrease exhaust gas emissions and increase engine efficiency. This may be compared to an air valve that, as it moves continuously from the fully closed position to the fully open position, has a plateaued period of airflow where the amount of airflow remains the same. Referring to the graph of FIG. 5, an exemplary line $E_1$ represents the air valve 14 having the cutouts 30 and 32 and thus the continuously increasing airflow, and an exemplary line $E_2$ (shown in phantom) represents another valve that does not have the cutouts and thus has a plateaued period of airflow. Also, a line $E_3$ represents an example throttle valve such as the throttle valve 12. In the graph, the x-axis shows the general position of the particular valve from the fully closed position to the fully open position, and therebetween; and the y-axis shows an opening area F (also shown in FIG. 3) through which air flows in the particular air valve during use, and shows an opening area through which air and fuel mixture flows in the example throttle valve during use.

Figure 3:
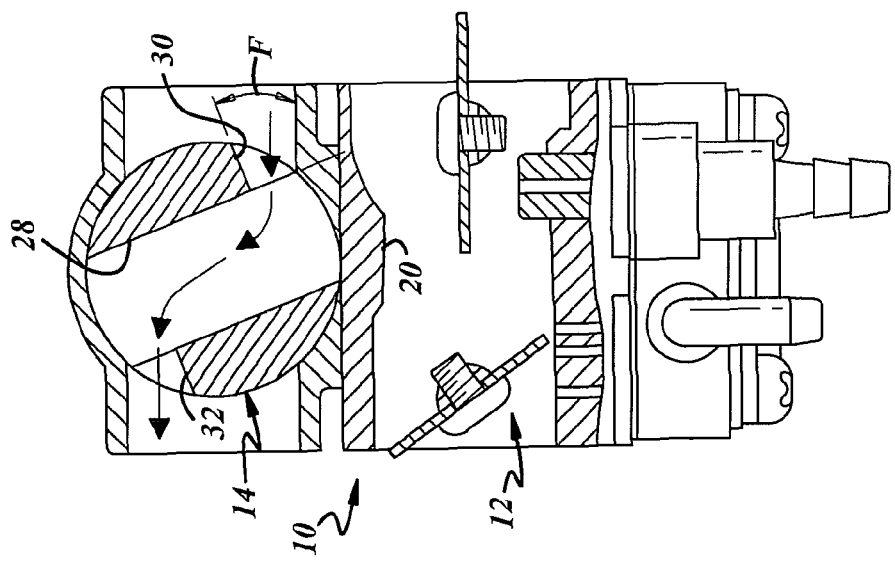
FIG. 3 is a sectional view of the valve assembly of FIG. 2 showing the valve assembly in the midst of opening.
Figure 4:
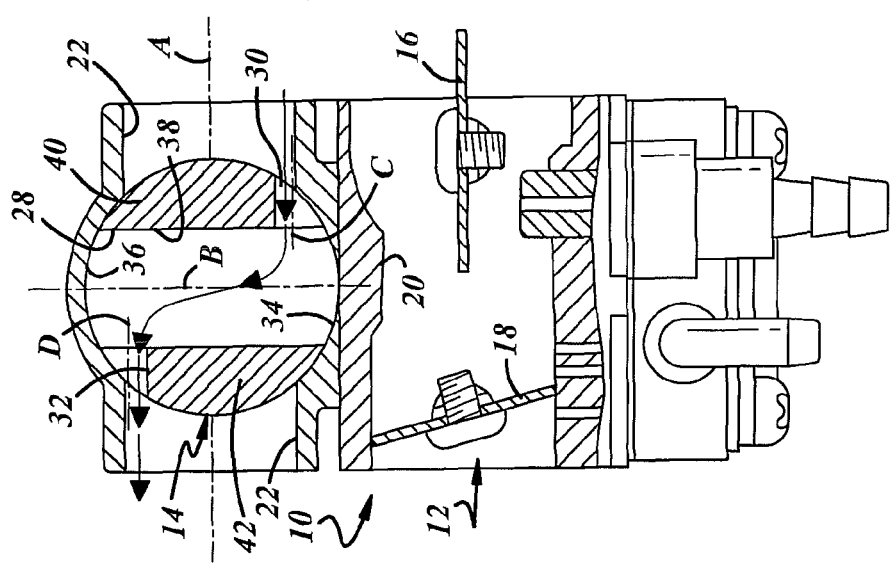
FIG. 4 is a sectional view of the valve assembly of FIG. 2 showing the valve assembly in a fully open position.

FIGS. 2-4 show the sequential movements of the throttle valve 12 and the air valve 14 as the valves move from their fully closed and to their fully open positions. Referring to FIG. 2, the throttle valve 12 and the air valve 14 are in their fully closed position. In this position, the internal combustion engine may be turned off or may be at an idle operating condition. No air or fuel (or a limited amount if at idle) may flow through the throttle valve 12, while some air may flow through the air valve 14. The center axis B may be generally perpendicular to the airflow axis A, and airflow (shown by unmarked arrows) may travel through the slight opening area F of the first cutout 30. From there, the airflow may travel through the air bore 28 and then through the second cutout 32 which itself may have an opening area sized equivalent to the opening area F of the first cutout 30. Referring to FIG. 3, the throttle valve 12 is slightly and partially open where some air and fuel mixture may flow through the air-fuel passage 20. In this position, the internal combustion engine may be in a low speed and low load operating condition, or a startup condition. The air valve 14 may be in a position where the air bore 28 is not itself directly open to airflow, but the opening area F may be at a maximum value with respect to the first cutout 30 thus letting an increased amount of airflow through the first cutout as compared to the position of FIG. 2. Referring to FIG. 4, both the throttle valve 12 and the air valve 14 are in the fully open position. In this position, the internal combustion engine may be in a wide-open throttle operating condition. Airflow may travel through the air bore 28 and need not travel through the first and second cutouts 30, 32.

FIGS. 6-18 show several exemplary embodiments of a valve assembly 110 that may be used in a carburetor (not fully shown) for a small two-stroke internal combustion engine 111 such as those found in chainsaws, brushcutters, and the like. The valve assembly 110 may include a throttle valve 112 to regulate air and fuel mixture flow, and may include an air valve 114 to regulate scavenging airflow. The air valve 114 may be designed and constructed so that the rate of change of airflow traveling through the air valve progressively increases as a rotational opening angle of the air valve increases from a fully closed position to a fully open position.

Figure 6:
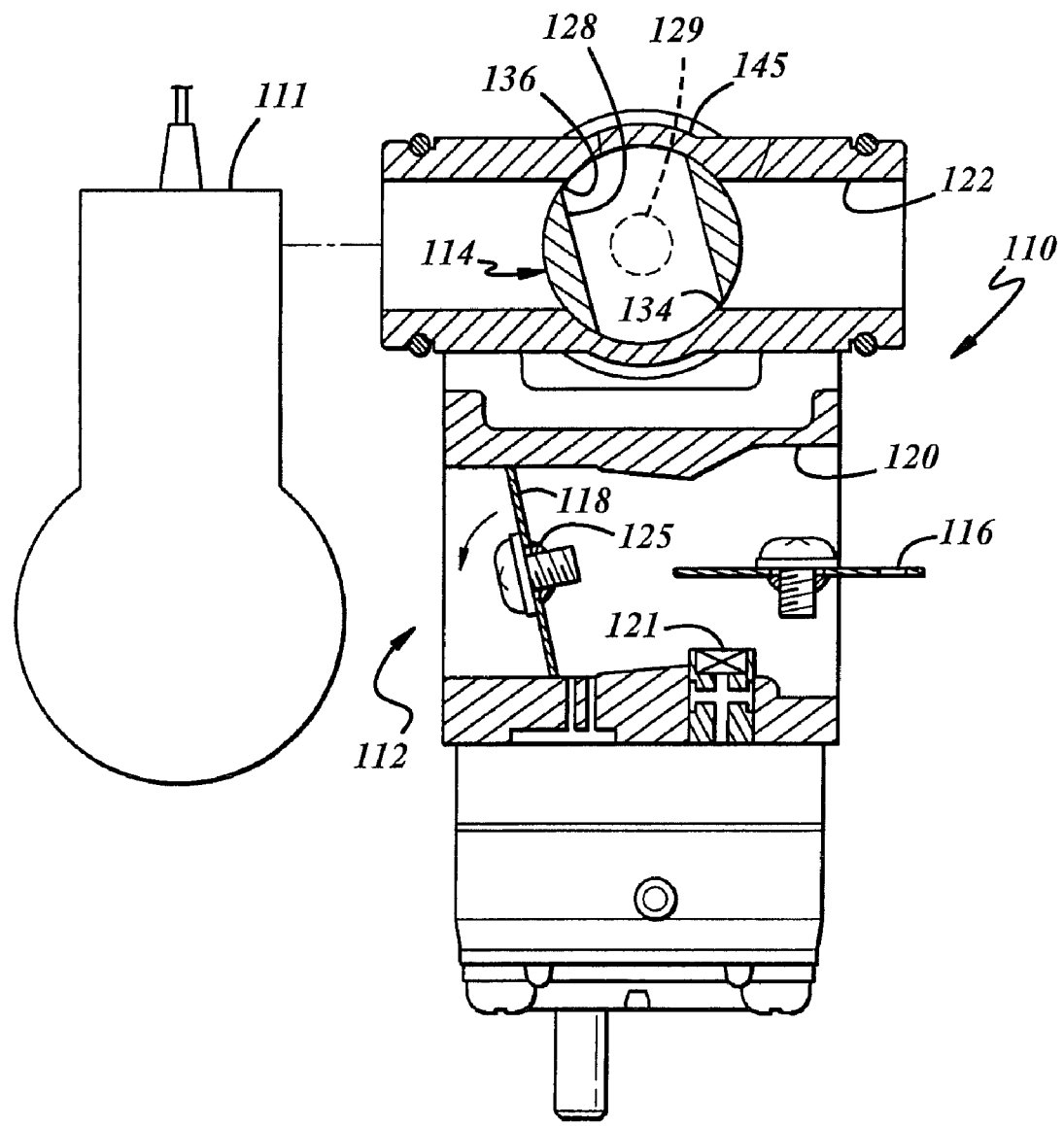
FIG. 6 is a sectional view of an exemplary embodiment of a valve assembly.

Referring to FIG. 6, the valve assembly 110 may include the throttle valve 112 and a choke valve 116 that are disposed in an air-fuel passage 120 and that open and close the air-fuel passage. Fuel enters the air-fuel passage 120 via a fuel nozzle orifice 121. The throttle valve 112 may include a disc-shaped head 118 and may be separate from the air valve 114 as shown, where the valves may be connected through a mechanical linkage or some other means, or may be one-piece where the throttle valve would be a rotary type valve.

Figure 7:
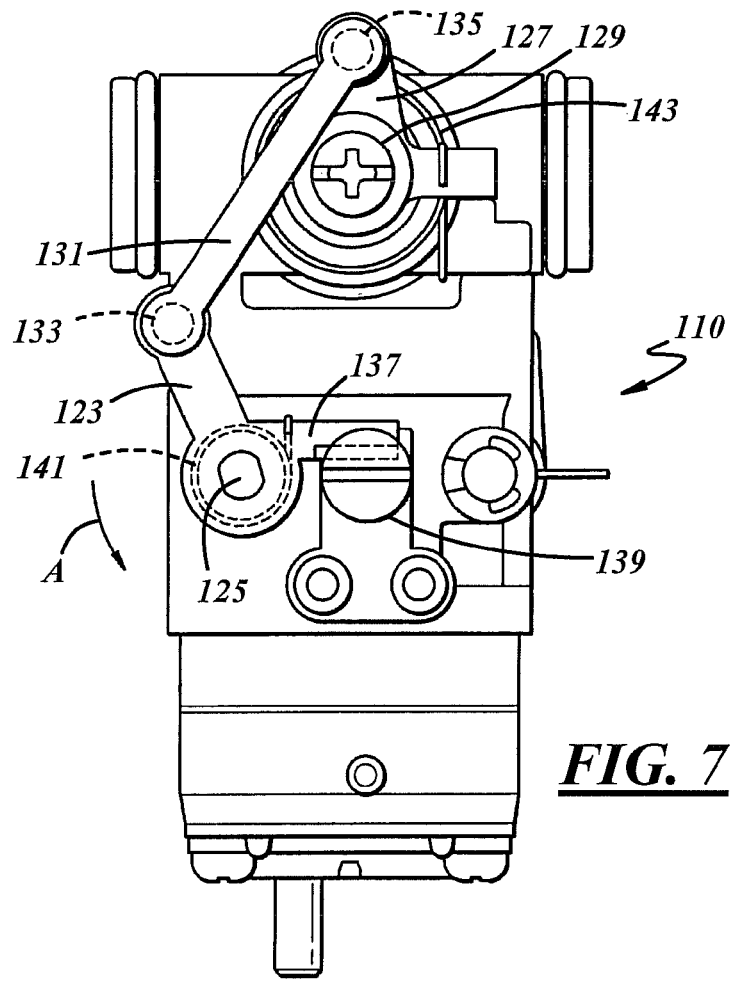
FIG. 7 is a side view of the valve assembly of FIG. 6.

In one example of a mechanical linkage, the throttle valve 112 and the air valve 114 may be linked in a synchronizing manner whereby the throttle valve and the air valve move simultaneously. Referring to FIG. 7, a synchronizing mechanism may have a first lever 123 connected to a shaft 125 of the throttle valve 112, and a second lever 127 connected to a shaft 129 of the air valve 114. A connecting rod 131 links the first and second levers 123, 127 together via pins 133, 135 and transfers motion therebetween. The first lever 123 may have an arm 137 that, in an idle operating condition, may engage a tapered head of an idle adjust screw 139 threaded into a main body of the carburetor. When the shaft 125 is fully rotated in a direction A, the arm 137 may abut a stopper (not shown) extending from the main body of the carburetor. Return springs 141, 143 respectively bias the air valve 114 and throttle valve 112 toward their closed positions. Of course, other synchronizing mechanism arrangements and constructions are possible.

Figure 8:
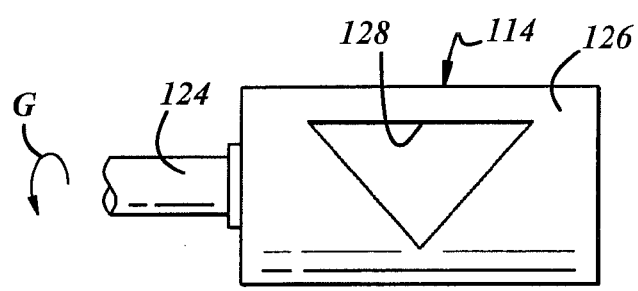
FIG. 8 is a side view of an exemplary embodiment of an air valve.

The air valve 114 may be held in a housing or casing 145 (FIG. 6) and may regulate airflow through an air passage 122 by permitting flow when the valve is open, permitting some flow when the valve is closed, and permitting flow therebetween. Referring to FIGS. 6 and 8, the air valve 114 may be of the rotary type and thus may be rotated during operation. The air valve 114 may be constructed as one-piece, or may be constructed out of multiple pieces. A shaft or stem portion 124 may be cylindrically shaped and may be used to rotate the air valve 114. A body portion 126 may be cylindrically shaped, may extend from the stem portion 124, and may define an air bore 128.

The air bore 128 communicates airflow from one side of the air passage 122 to the other side of the air passage. Referring to FIGS. 8-12, in the illustrated embodiment the air bore 128 may have a generally triangular shape in cross-section with an apex of the triangular shape pointing in a direction of opening rotation G. The air bore 128 may be formed completely through the body portion 126 and may extend from a first open end 134 and to a second open end 136.

Figure 9:
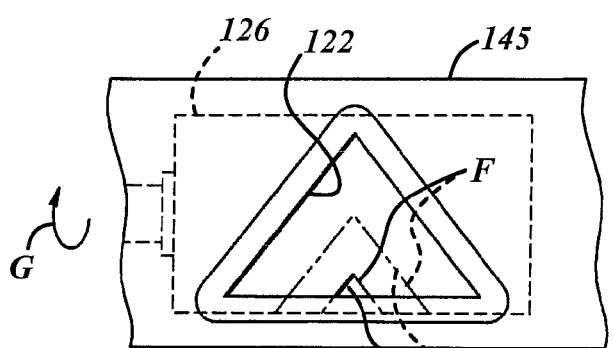
FIG. 9 is a side view of an exemplary embodiment of an air passage interacting with the air valve of FIG. 8.
Figure 10:
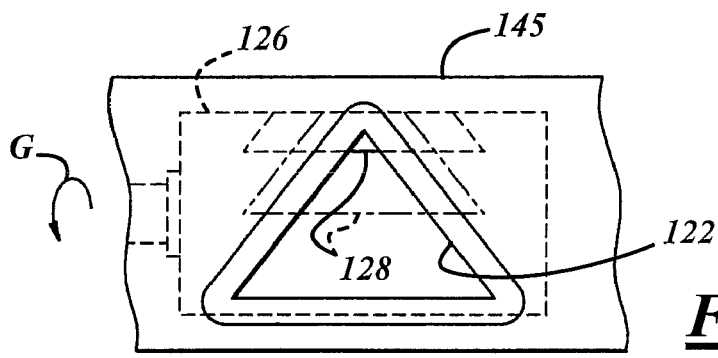
FIG. 10 is a side view of the air passage of FIG. 9 interacting with the air valve of FIG. 8.

FIGS. 9 and 10 show how the air bore 128 interacts with the air passage 122 as the air valve 114 rotates therein. FIG. 9 is a front view as seen from an airflow inlet with respect to the air bore 128, and FIG. 10 is a rear view as seen from an airflow outlet. The air passage 122 may have a generally triangular shape that complements the shape and size of the air bore 128. The air bore 128 shown by solid lines represents the fully closed position when the internal combustion engine may be turned off or may be in the idle operating condition. In this position, the air bore 128 is slightly opened so that a small amount of air may flow through the air bore, as compared to being completely closed where no amount of air would flow through the air bore. As the air valve 114 begins to rotate in the direction of opening rotation G, the size of the opening area F immediately begins to increase, and continuously and progressively increases throughout full rotation, and the amount of airflow traveling through the air bore 128 immediately begins to increase, and continuously and progressively increases. The air bore 128 shown by phantom lines represents a partially opened position when the internal combustion engine may be in a half-throttle operating condition. In the fully open position, the air bore 128 coincides with the air passage 122 and the internal combustion engine may be in the wide-open throttle operating condition.

In at least some embodiments, at some or all points from the fully closed position to the fully open position, the rate of change of airflow traveling through the air bore 128 may continuously and/or progressively increase in value as the rotational opening angle increases in value and as the opening area F increases in value. No rapid increases or jumps in the amount of airflow to the internal combustion engine occur from the fully closed or partially opened position to the fully open position upon rapid acceleration of the engine. Leaning-out the engine with an undesirable increased amount of airflow and discontinuities in the amount of airflow to the engine may consequently be avoided.

Figure 12:
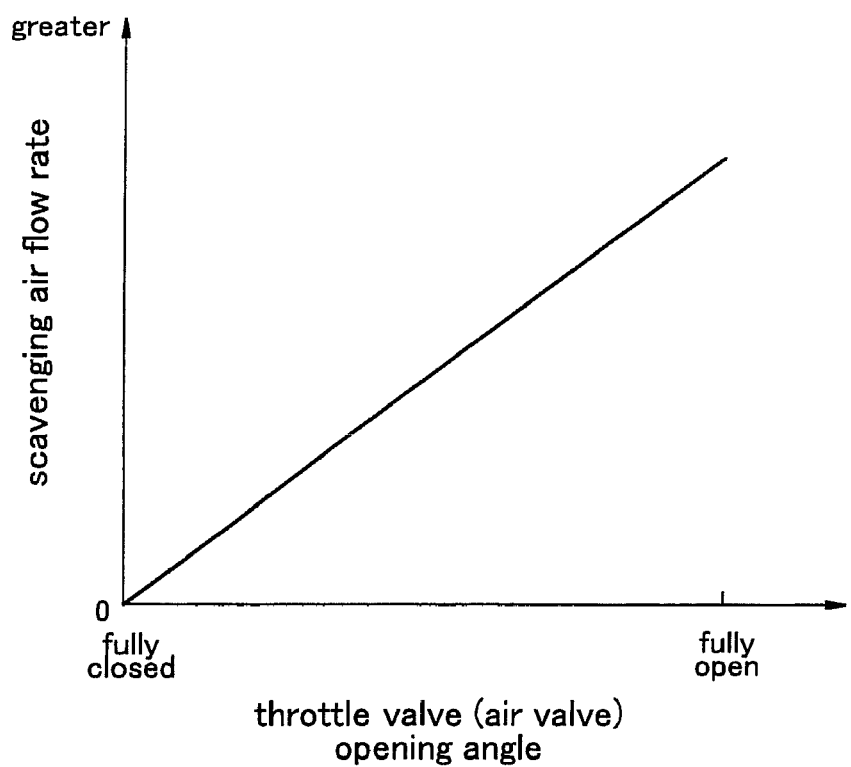
FIG. 12 is a graph showing the scavenging airflow rate of the air valve of FIG. 11 from a fully closed position to a fully open position.
Figure 11:
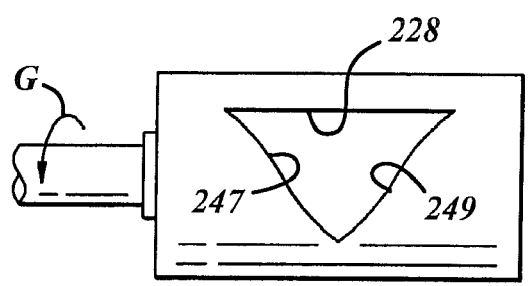
FIG. 11 is a side view of an exemplary embodiment of an air valve.

Avoiding rapid increases in the amount of airflow traveling through the air bore 128 and to the internal combustion engine can be achieved in a number of air bore configurations, shapes, and/or sizes, and the resulting rate of change of airflow and airflow amount may differ. For example, FIG. 11 shows another illustrated embodiment of an air bore 228 which may have a generally triangular shape with two sides 247, 249 being curved inward adjacent its base, and being curved outward adjacent its apex. FIG. 12 shows the resulting graph of the scavenging airflow rate from the fully closed to the fully open positions. The resulting airflow rate or amount may increase in a substantially constant and continuous way.

Figure 13:
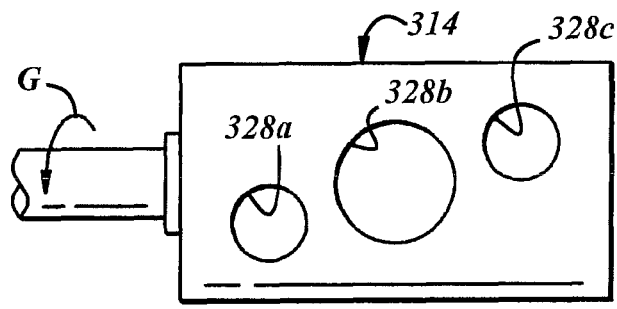
FIG. 13 is a side view of an exemplary embodiment of an air valve.

FIG. 13 shows another illustrated embodiment of an air valve 314 which may have multiple individual and separate air bores. A first air bore 328a may have a cylindrical shape. A second air bore 328b may have a cylindrical shape with a larger diameter than the first air bore 328a, and may be axially and circumferentially offset from the first air bore. A third air bore 328c may have a cylindrical shape with a similar diameter as the first air bore 328a, and may be axially and circumferentially offset from the second air bore 328b. The associated air passage may be shaped so that, upon opening rotation, the first air bore 328a may communicate with the air passage before the second air bore 328b and the second air bore may communicate with the air passage before the third air bore 328c. In one example, the air passage may be a single oval or ellipse extending lateral and longitudinal distances to the same extent as between the first and third air bore 328a, 328c. In another example, the air passage may have three individual and separate air passages, one for each air bore. In this case, each air passage may have the same diameter as its respective air bore, and may extend across the entire range of the rotational opening movement from the fully closed to the fully open positions.

Figure 14:
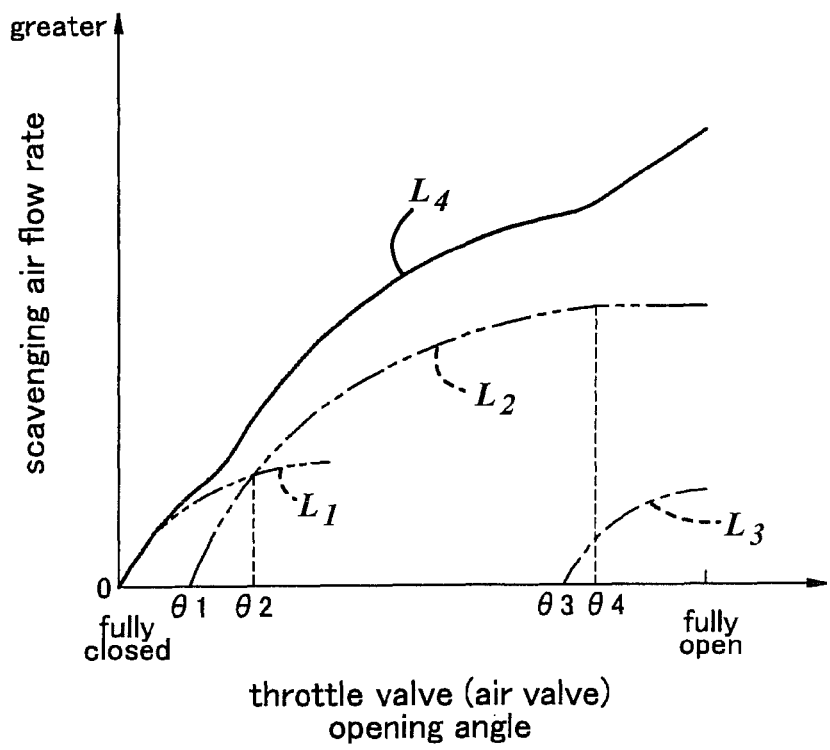
FIG. 14 is a graph showing the scavenging airflow rate of the air valve of FIG. 13 from a fully closed position to a fully open position.

FIG. 14 shows the resulting graph of the scavenging airflow rate from the fully closed to fully open positions using the air valve 314. As the air valve 314 begins to rotate open, the first air bore 328a initially communicates with the air passage as represented by phantom line $L_1$ and is fully open beginning at rotational opening angle $\theta_2$. At rotational opening angle $\theta_1$, the second air bore 328b initially communicates with the air passage, and continues the communication as represented by phantom line $L_2$. The second air bore 328b is fully open beginning at rotational opening angle $\theta_4$. At rotational opening angle $\theta_3$, the third air bore 328c initially communicates with the air passage, and continues the communication as represented by phantom line $L_3$. The third air bore 328c is fully open when the air valve 314 is fully open. Solid line $L_4$ represents the resulting airflow rate or amount as the first, second, and third air bores 328a, 328b, 328c sequentially communicate with the air passage. The rate of change of airflow traveling through the air valve 314 increases as the second air bore 328b communicates with the air passage as compared to the first air bore 328a, but the amount of airflow does not relatively rapidly increase upon rapid acceleration of the internal combustion engine. The exact direction and shape of the solid line $L_4$ may be modified by, among other things, adjusting the shapes of the air bores, adjusting the diameters of cylindrical air bores, and adjusting the overlapping relationships of individual air bores in order to optimize engine acceleration performance and air scavenging performance.

Figure 15:
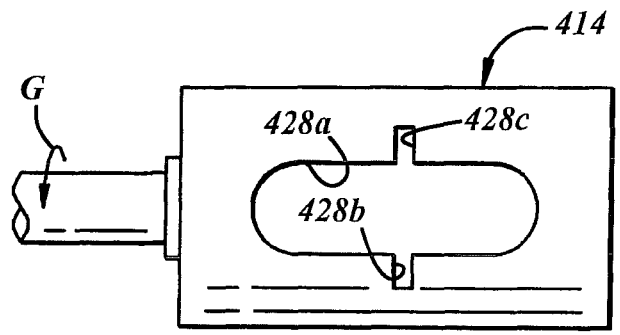
FIG. 15 is a side view of an exemplary embodiment of an air valve.

FIG. 15 shows another illustrated embodiment of an air valve 414 which may have a first air bore 428a with a cross-section resembling a rectangle with rounded-off corners, may have a first slot air bore 428b, and may have a second slot air bore 428c. The associated air passage may be shaped similarly to the first air bore 428a, first slot air bore 428b, and second slot air bore 428c, or may have another shape. Similar to previously-described embodiments, in the air valve 414 the amount of airflow does not relatively rapidly increase upon rapid acceleration of the internal combustion engine.

Figure 16:
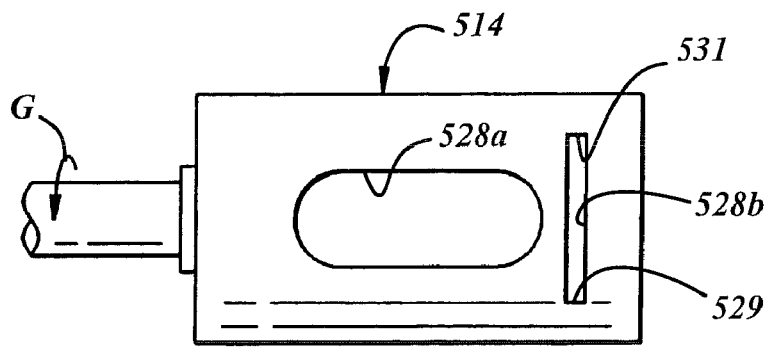
FIG. 16 is a side view of an exemplary embodiment of an air valve.

FIG. 16 shows another illustrated embodiment of an air valve 514 which may have a first air bore 528a with a cross-section resembling a rectangle with rounded-off corners, and may have a slot air bore 528b. The slot air bore 528b may extend longitudinally from a first end 529 to a second end 531. The first end 529 may be pointed in the direction of opening rotation G. The associated air passage may be shaped similarly to the first air bore 528a and the slot air bore 528b, or may have another shape. Similar to previously-described embodiments, in the air valve 514 the amount of airflow does not relatively rapidly increase upon rapid acceleration of the internal combustion engine.

Figure 17:
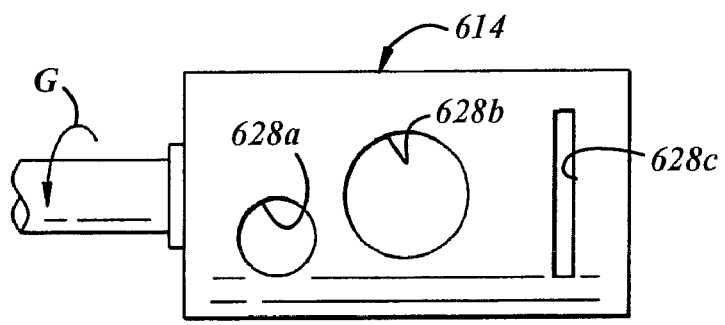
FIG. 17 is a side view of an exemplary embodiment of an air valve.

FIG. 17 shows another illustrated embodiment of an air valve 614 which may have a first air bore 628a with a cylindrical shape, a second air bore 628b with a cylindrical shape, and a slot air bore 628c. The associated air passage may be shaped similarly, or may have another shape. Similar to previously-described embodiments, in the air valve 614 the amount of airflow does not relatively rapidly increase upon rapid acceleration of the internal combustion engine.

Figure 18:
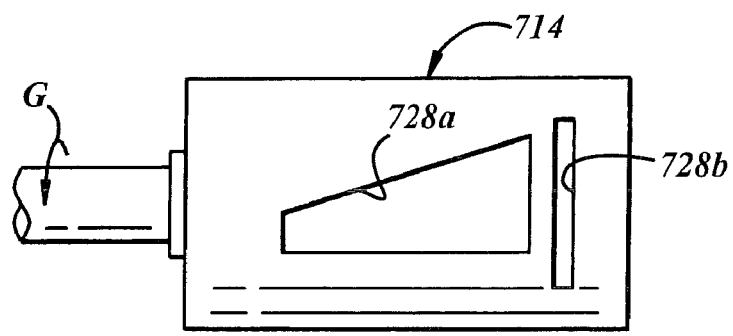
FIG. 18 is a side view of an exemplary embodiment of an air valve.

FIG. 18 shows another illustrated embodiment of an air valve 714 which may have an air bore 728a with a trapezoid shape and a slot air bore 728b. The associated air passage may be shaped similarly, or may have another shape. Similar to previously-described embodiments, in the air valve 714 the amount of airflow does not relatively rapidly increase upon rapid acceleration of the internal combustion engine.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A scavenging valve assembly in a carburetor for an engine, the scavenging valve assembly comprising: a butterfly throttle valve opening and closing an air-fuel passage of the carburetor; and a rotary air valve for controlling airflow through an air scavenging passage of the carburetor, the rotary air valve having a cylindrical body with an air bore extending transversely therethrough and rotatable between an engine idle position in which the rotary air valve is not completely closed and a fully open position, a first cutout in a first open end of the air bore configured to communicate the air bore with only an upstream portion of the air scavenging passage when the rotary air valve is in its engine idle position and a second cutout in a downstream second open end of the air bore configured to communicate the air bore with only the downstream portion of the air scavenging passage when the rotary air valve is in its engine idle position so that the cutouts in conjunction with the air bore provide a continuous air flow path through the air scavenging passage from upstream of the cylindrical body through the first cutout into the air bore, through the air bore and from the air bore through the second cutout to downstream of the cylindrical body when the air valve is in its engine idle position, and, when the air valve begins to rotate from its engine idle position to its fully open position, the size of an opening area that airflow travels through the air bore continuously increases and airflow through the air bore continuously increases.

2. The scavenging valve assembly of claim 1 wherein the air bore has a center axis, the first cutout has a first center axis that is perpendicular to the air bore center axis, and the second cutout has a second center axis that is perpendicular to the air bore center axis.

3. The scavenging valve assembly of claim 1 further comprising a synchronizing mechanism connecting the throttle valve to the air valve such that the movements of the throttle and air valve are concurrent from the engine idle position to the fully open position.

4. The scavenging valve assembly of claim 3 wherein, when the air valve rotates from the engine idle postition to the fully open position, the rate of change of airflow traveling through the at least one air bore increases as a rotational opening angle of the air valve increases.

5. The scavenging valve assembly of claim 4 wherein the air bore has a cross-section of a generally triangular shape with an apex of the triangle being pointed in the direction of opening movement.

6. The scavenging valve assembly of claim 4 wherein the at least one air bore includes a first cylindrical air bore, a second cylindrical air bore, and a third cylindrical air bore, the first, second, and third cylindrical air bores are axially and circumferentially offset with respect to each other such that, when the air valve rotates from the engine idle position to the fully open position, airflow travels through the first cylindrical air bore before the second cylindrical air bore and through the second cylindrical air bore before the third cylindrical air bore.

7. The scavenging valve assembly of claim 4 wherein the at least one air bore includes a slot air bore extending longitudinally from a first end to a second end with the first end being pointed in the direction of opening movement.

8. The scavenging valve assembly of claim 7 wherein the at least one air bore includes a first air bore having a cross-section of a rectangle with rounded corners, and wherein airflow travels through the slot air bore before the first air bore.

9. The scavenging valve assembly of claim 7 wherein the at least one air bore includes a generally cylindrical air bore, and wherein airflow travels through the slot air bore before the cylindrical air bore.

10. The scavenging valve assembly of claim 7 wherein the at least one air bore includes an air bore having a cross-section of a trapezoid, and wherein airflow travels through the slot air bore before the trapezoid air bore.

11. A valve assembly for use in a carburetor for an engine, the valve assembly comprising:
a butterfly throttle valve controlling the flow through an air-fuel mixture passage of the carburetor and movable between an engine idle position in which a rotary air valve is not completely closed and a fully open position; and the rotary air valve controlling airflow through an air scavenging passage of the carburetor, the air valve having a cylindrical body with an air bore extending transversely therethrough from a first open end to a second open end and rotatable between the engine idle position and the fully open position, the air valve having a first cutout located at the first open end of the air bore configured to communicate the air bore with only an upstream portion of the air scavenging passage when the air valve is in its engine idle position and having a second cutout located at the second open end of the air bore configured to communicate the air bore with only the downstream portion of the air scavenging passage when the air valve is in its engine idle position so that the cutouts in conjunction with the air bore provide a continuous air flow path through the air scavenging passage from upstream of the cylindrical body through the first cutout into the air bore, through the air bore and from the air bore through the second cutout to downstream of the cylindrical body when the air valve is in its engine idle position; and wherein, when the air valve is in its engine idle position, airflow travels through the air bore, and wherein, as the air valve moves from its engine idle position to its fully open position, the amount of airflow through the air bore continuously increases.

12. The valve assembly of claim 11 wherein the air bore has a center axis, the first cutout is a first slit with a first center axis perpendicular to the center axis, and the second cutout is a second slit with a second center axis perpendicular to the center axis.

13. The valve assembly of claim 11 wherein, in cross-section, the first cutout is located at a position diametrically opposite a position of the second cutout.

14. The valve assembly of claim 11 further comprising the air passage, the air valve being disposed in the air passage, the air passage having an airflow axis, the air bore having a center axis, the first cutout having a first center axis, and the second cutout having a second center axis, and wherein, when the air valve is in the engine idle position, the center axis lies perpendicular to the airflow axis and the first and second center axes lie parallel to the airflow axis.

15. The valve assembly of claim 11 wherein, when the air valve is in the engine idle position, the air valve has an open area of airflow, and wherein, when the air valve moves from the fully closed position and to the fully open position, the amount of open area continuously increases.

16. The valve assembly of claim 11 further comprising the passage, the air valve being disposed in the air passage, and wherein, when the air valve is in the engine idle position, airflow travels from one side of the air passage, through the first cutout, through the air bore, through the second cutout, and to the other side of the air passage.

17. The valve assembly of claim 11 further comprising:
a synchronizing mechanism connecting the throttle valve to the air valve such that the movements of the throttle valve and the air valve are concurrent from the engine idle position to the fully open position;
wherein, when the air valve rotates from the engine idle position to the fully open position, the rate of change of airflow traveling through the air bore increases as a rotational opening angle of the air valve increases.

18. The valve assembly of claim 17 wherein a cross-section of the air bore has a generally triangular shape with the apex of the triangle being pointed in the direction of opening movement.

19. The valve assembly of claim 17 wherein the at least one air bore includes a plurality of individual air bores extending through the air valve.

* * * * *

UNITED STATES PATENT AND TRADEMARK OFFICE
CERTIFICATE OF CORRECTION

PATENT NO. : 8,261,775 B2
APPLICATION NO. : 12/367264
DATED : September 11, 2012
INVENTOR(S) : Tamio Aihara et al.

Page 1 of 1

It is certified that error appears in the above-identified patent and that said Letters Patent is hereby corrected as shown below:

IN THE CLAIMS:

Column 10, in claim 16, Line 14, after "the" (second occurrence) insert -- air --.

Signed and Sealed this
Eighteenth Day of December, 2012

David J. Kappos
*Director of the United States Patent and Trademark Office*